United States Patent
Flanagan

(10) Patent No.: US 7,848,775 B2
(45) Date of Patent: Dec. 7, 2010

(54) CELL PHONE WITH SELECTIVE TRANSMISSION OF A SLAM OR OTHER SOUND

(76) Inventor: David Flanagan, 15077 Glastonbury, Detroit, MI (US) 48223

( * ) Notice: Subject to any disclaimer, the term of this patent is extended or adjusted under 35 U.S.C. 154(b) by 682 days.

(21) Appl. No.: 11/880,460

(22) Filed: Jul. 20, 2007

(65) Prior Publication Data

US 2008/0045183 A1 Feb. 21, 2008

Related U.S. Application Data

(60) Provisional application No. 60/832,670, filed on Jul. 20, 2006.

(51) Int. Cl.
*H04M 1/00* (2006.01)

(52) U.S. Cl. .................. 455/550.1; 455/556.1; 455/418; 455/414.1; 379/88.01

(58) Field of Classification Search ............... 455/550.1, 455/556.1, 418, 414.1; 379/88.01
See application file for complete search history.

(56) References Cited

U.S. PATENT DOCUMENTS

| 6,167,278 | A  | * | 12/2000 | Nilssen | ........................ | 455/462 |
| 6,532,371 | B2 | * | 3/2003  | Ezumi   | ........................ | 455/557 |
| 7,272,419 | B1 | * | 9/2007  | Schutze et al. | .............. | 455/566 |

* cited by examiner

*Primary Examiner*—Danh C Le
(74) *Attorney, Agent, or Firm*—John R. Benefiel

(57) ABSTRACT

A cell phone is equipped to selectively send a prerecorded sound such as a telephone handset being slammed down on its cradle to a connected cell phone by an activation key, and thereafter disconnect the call.

2 Claims, 3 Drawing Sheets

CELL PHONE WITH SELECTIVE TRANSMISSION OF A SLAM OR OTHER SOUND

CROSS REFERENCE TO RELATED APPLICATIONS

This application claims the benefit of U.S. provisional application No. 60/832,670 filed on Jul. 20, 2006.

BACKGROUND OF THE INVENTION

This invention concerns cell phones which have come into very widespread use in recent years. These devices are hand held and do not have a separate handset which is placed in a cradle base to hang up a call, but rather a button is pushed to disconnect the call.

Sometimes situations arise where a slamming disconnect is desired to communicate the feelings of one party to a call to the other person who is a party to the call. The silent disconnection of the call on a cell phone is somewhat inadequate in that situation to fully express a party's frustration. There are other situations where a particular sound effect and/or pre-recorded message might be desired to be sent from one party to the other during a phone conversation.

It is the object of the present invention to provide a cell phone feature which allows a cell phone user to selectively transmit a pre-recorded sound effect and/or message to the other party to a call.

SUMMARY OF THE INVENTION

The above recited object as well as other objects which will be appreciated upon a reading of the following specification and claims are achieved by a selectively activated cell phone feature which transmits a prerecorded sound or message to the other party to a cell phone call, such as the sound of a handset being slammed onto its cradle and which also may immediately thereafter disconnect the call.

The feature can rely on the memory capabilities of the cell phone as is conventionally used for storing ring tones to allow alternate selections of a ring tone with suitable software enabling transmission of a recorded sound and one or more message when the feature is activated. The sound transmission feature can be triggered by a dedicated button on the cell phone, or a combination or special manipulation of one or more of the standard keys used for other purposes. The transmission of the slam or other sound can optionally be accompanied by a recorded voice message or a message only transmitted as desired. Suitable variations in sounds and/or voice messages can be downloaded as from the internet or from the cell phone service provider.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
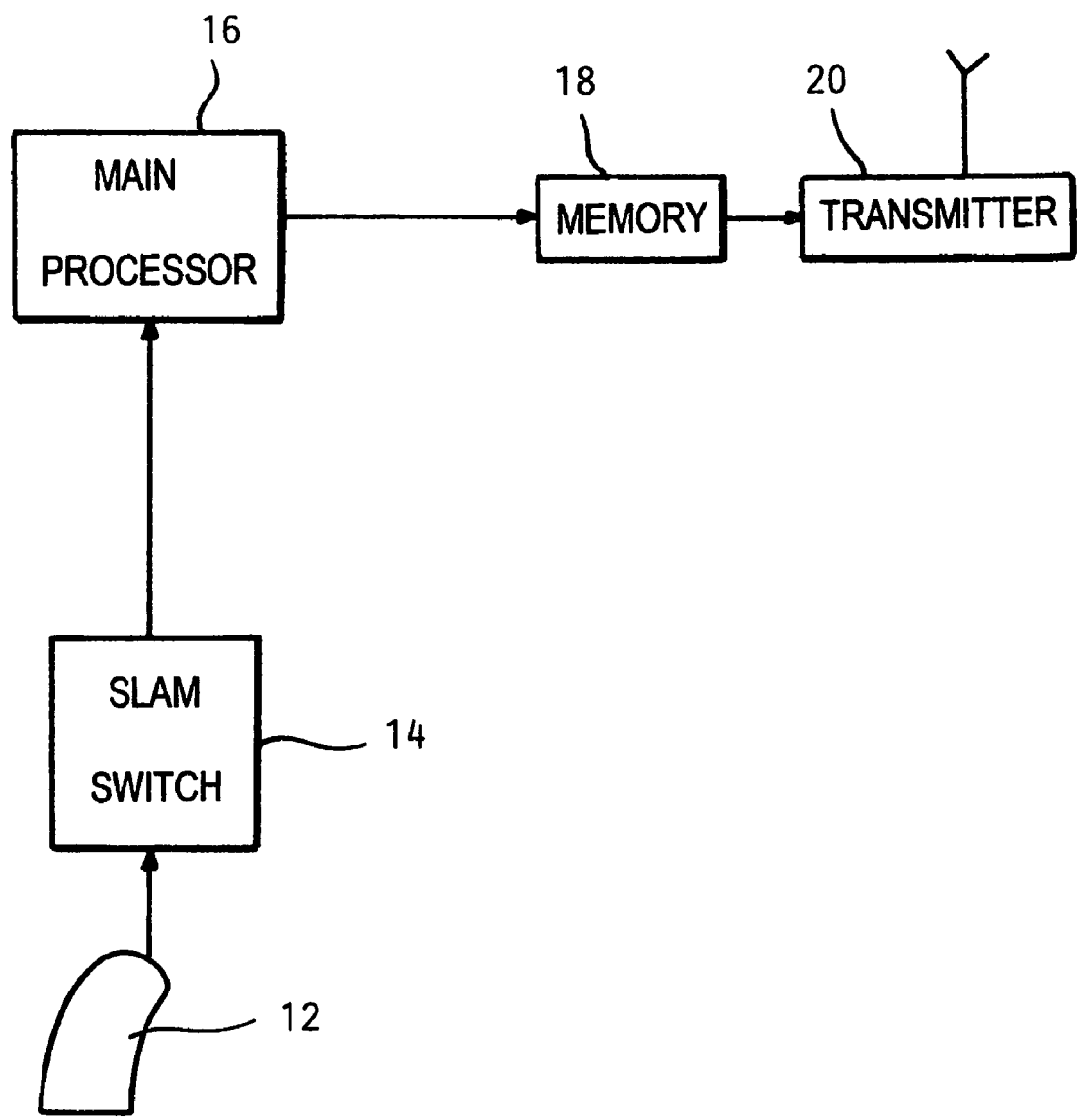
FIG. 1 is a block diagram of cell phone components.
Figure 2:
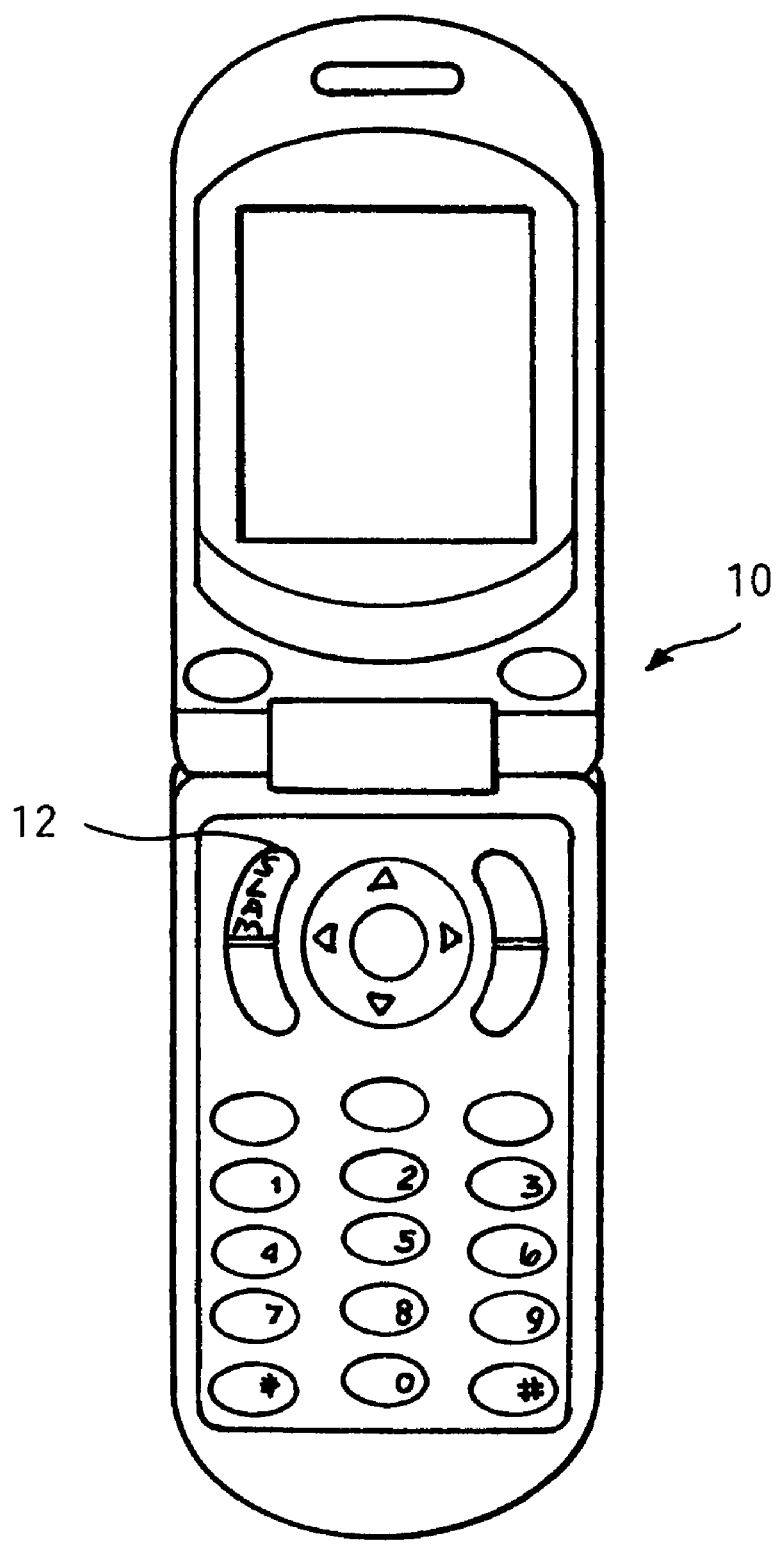
FIG. 2 is a keyboard of a cell phone having a dedicated slam sound activation key.

Referring to the drawings, and particularly FIGS. 1 and 2 a conventional cell phone 10 can be provided with a sound and/or message selective transmission feature by a activation key 12 which when depressed causes an activation device or software 14 to send a signal to the cell phone main processor 16. A special key can be provided for the activation key 12, or the main processor 16 can be programmed to respond to certain coding or manipulation of one or more of the conventional keys such as by repeated pressing or holding a key.

The main processor 16 is programmed as with suitable software to cause the cell phone memory 18 normally provided to store ring tones, etc., to output a signal corresponding to a prerecorded sound or message perhaps at an elevated volume, to the cell phone transmitter 20 (normally used to transmit speech from a cell phone microphone) causing the same to be sent to the other connected party during a call. As soon as that transmission has occurred, the same software may also disconnect the call.

The sound may be that of a telephone handset being slammed down onto a base unit cradle in order to convey the party's anger, frustration, etc.

Optionally, a voice message and/or other sound can also be prerecorded in the memory 18 to be caused to be transmitted just prior to or after the slam sound transmission instead of the slam sound only.

Other sounds and/or voice messages can be downloaded from the internet (if the cell phone has the capability) or from the cell phone service provider.

Figure 3:
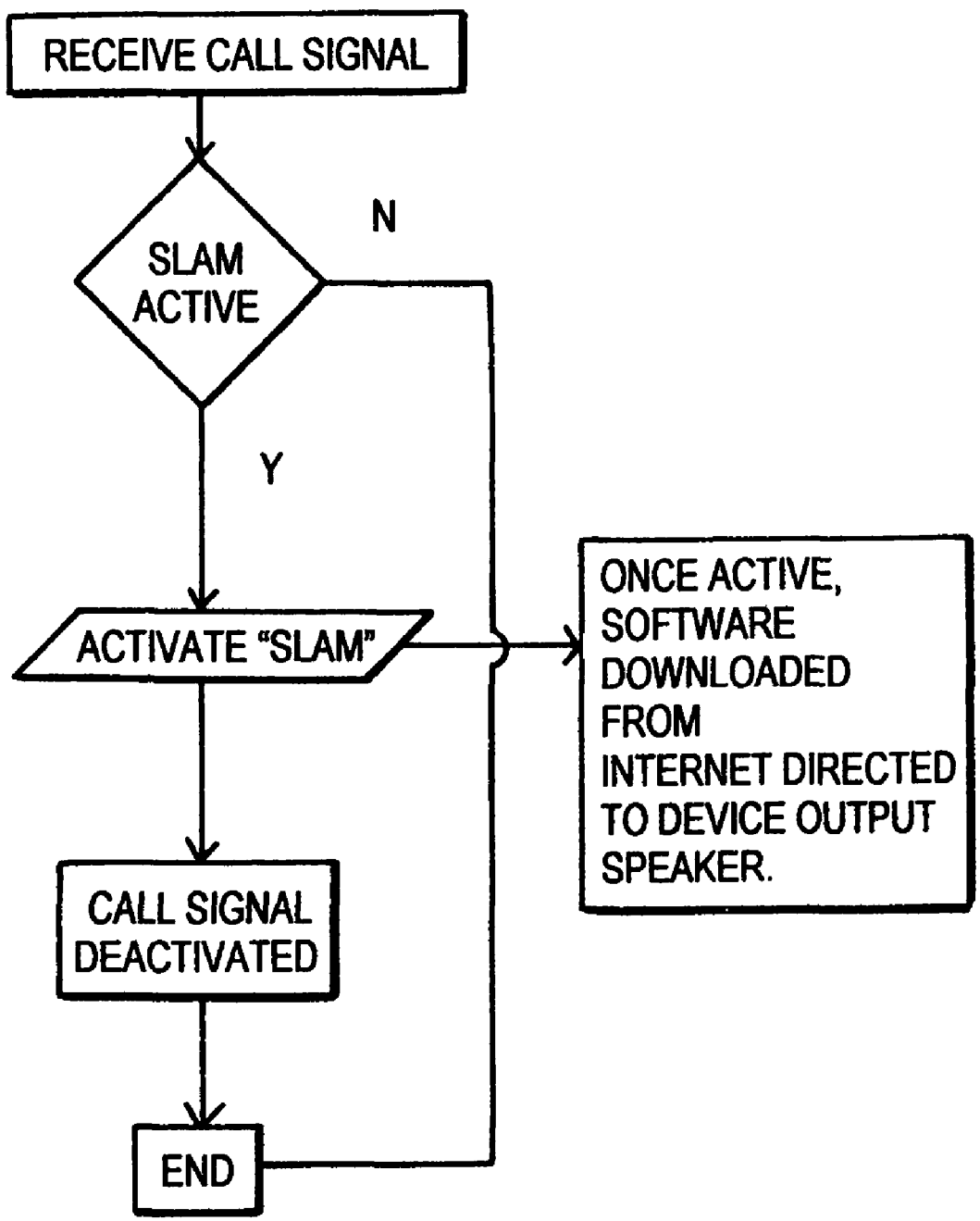
FIG. 3 is a flow chart showing software used to execute the slam sound transmission feature.

FIG. 3 shows a flow chart of suitable software. After a call is received, the slam feature is activated and the slam sound (which may be downloaded from the internet) is transmitted and the call signal thereafter deactivated.

If the slam sounding feature is not activated, the call proceeds as usual.

The invention claimed is:

1. In a cell phone having a keyboard, a main processor, a memory and a transmitter for sending sounds to another cell phone connected via a cell phone network, the improvement including a selectively operated activation key causing the main processor to send a prerecorded sound stored in memory to said transmitter so as to be sent to said another cell phone upon operation of said activation key;
    said prerecorded sound being that of a conventional telephone handset being slammed down onto a cradle; and,
    said call to said another cell phone disconnected by said main processor immediately after said prerecorded slam sound is sent to another cell phone.

2. A method selectively causing a prerecorded sound of a conventional telephone handset being slammed down onto a cradle to be transmitted from one cell phone to another cell phone connected to each other by a cell phone network including prerecording said sound of a telephone handset being slammed down onto its cradle in said one cell phone memory, and selectively activating a cell phone main processor to cause said prerecorded sound of a telephone handset being slammed down onto its cradle to be sent to a cell phone transmitter to be sent to said another cell phone and
    disconnecting said cell immediately after said prerecorded slamming sound has been sent.

* * * * *